(12) United States Patent
Naouri et al.

(10) Patent No.: US 9,608,842 B2
(45) Date of Patent: Mar. 28, 2017

(54) PROVIDING, AT LEAST IN PART, AT LEAST ONE INDICATION THAT AT LEAST ONE PORTION OF DATA IS AVAILABLE FOR PROCESSING

(71) Applicant: Intel Corporation, Santa Clara, CA (US)

(72) Inventors: Ygdal Naouri, Jerusalem (IL); Ronen Chayat, Haifa (IL); Ben-Zion Friedman, Jerusalem (IL); Parthasarathy Sarangam, Portland, OR (US); Anil Vasudevan, Portland, OR (US); Alain Gravel, Thousand Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 14/106,253

(22) Filed: Dec. 13, 2013

(65) Prior Publication Data

US 2015/0169325 A1    Jun. 18, 2015

(51) Int. Cl.
*G06F 3/00* (2006.01)
*H04L 12/64* (2006.01)

(52) U.S. Cl.
CPC .............................. *H04L 12/6418* (2013.01)

(58) Field of Classification Search
CPC ..................................................... G06F 13/385
See application file for complete search history.

(56) References Cited

U.S. PATENT DOCUMENTS

| | | | |
|---|---|---|---|
| 5,434,872 A | | 7/1995 | Petersen |
| 5,895,489 A | * | 4/1999 | Hammond .......... G06F 12/0815 711/141 |
| 6,145,016 A | * | 11/2000 | Lai et al. ........................... 710/4 |
| 7,818,470 B2 | * | 10/2010 | Wang et al. ..................... 710/18 |
| 2006/0195642 A1 | * | 8/2006 | Arndt et al. .................... 710/240 |
| 2008/0091855 A1 | * | 4/2008 | Moertl et al. ................... 710/52 |
| 2009/0086751 A1 | | 4/2009 | Wang |

FOREIGN PATENT DOCUMENTS

| | | |
|---|---|---|
| JP | 2006114030 A | 4/2006 |
| JP | 2008146566 A | 6/2008 |
| JP | 2011221831 A | 11/2011 |

OTHER PUBLICATIONS

INTEL® Ethernet Converged Network Adapters, "Solutions for Ultra-low Latency, High-throughput Computing", 1012/WM/MESH/PDF, 2012, 4 pages.

(Continued)

*Primary Examiner* — Henry Tsai
*Assistant Examiner* — Juanito Borromeo
(74) *Attorney, Agent, or Firm* — Christopher K. Gagne

(57) ABSTRACT

An embodiment may include circuitry that may provide, at least in part, at least one indication that at least one portion of data is available for processing by at least one data processor. The at least one indication may be provided, at least in part, prior to the entirety of the at least one portion of the data being available for the processing by the at least one data processor. The at least one data processor may begin the processing in response, at least in part, to the at least one indication. Many alternatives, variations, and modifications are possible.

25 Claims, 4 Drawing Sheets

(56) References Cited

OTHER PUBLICATIONS

INTEL® "Ethernet Server Adapter X520-T2", 10 Gigabit BASE-T Ethernet Server Adapter Designed for Multi-Core Processors and Optimized for Virtualization, Network Connectivity, 0810/SWU, 2010, 4 pages.
White Paper, "Simplifying the Network with 10 Gigabit Ethernet Unified Networking", An Intel and EMC Perspective, 0111/BY/OCG/XX/PDF, 2011, 8 pages.
INTEL® "Ethernet Switch Converged Enhanced Ethernet (CEE) and Datacenter Bridging (DCB)", White Paper, Feb. 2009, pp. 1-14.
INTEL® "Ethernet Switch FM6000 Series—Software Defined Networking", White Paper, 2012, pp. 1-8.
INTEL® "Ethernet Switch FM6000 Series", 10/40 GbE Low Latency Switching Silicon, Network Connectivity, 2013, 2 pages.
Office Action dated Nov. 10, 2015 in Japanese Patent Application No. 2014-229699 (3 pages, with 3 pages of English summarized translation).
Decision to Grant a Patent dated Mar. 1, 2016 in Japanese Patent Application No. 2014-229699 (3 pages with 3 pages of summarized English translation).

\* cited by examiner

PROVIDING, AT LEAST IN PART, AT LEAST ONE INDICATION THAT AT LEAST ONE PORTION OF DATA IS AVAILABLE FOR PROCESSING

TECHNICAL FIELD

This disclosure relates to facilitating, at least in part, by circuitry, the accessing of at least one controller command interface.

BACKGROUND

In conventional networking arrangements, conventional pull or push techniques are employed to fetch packets to be transmitted from host memory. For example, in a conventional pull technique, depending upon the particular host operating system that is used, a host central processing unit (CPU) either writes the packet and its descriptor into host kernel memory, or passes the application buffer (containing the packet) to the host kernel and thereafter writes the packet's header and descriptor into the kernel memory. Thereafter, in this conventional pull technique, the CPU writes a doorbell to alert the host's network interface controller (NIC). In response to the doorbell, the NIC reads the descriptor and packet from host memory. The NIC then schedules and processes the packet for transmission, and thereafter, transmits the packet from the host.

Unfortunately, the above operations involved in carrying out this conventional pull technique introduce significant latencies in obtaining, processing, and transmitting the packet from the NIC. As can be readily appreciated, these latencies are undesirable, especially in the case of latency intolerant and/or critical traffic.

In a conventional push technique, the CPU provides an implicit doorbell by copying the packet and/or descriptor directly into the NIC memory. In response, the NIC schedules and processes the packet for transmission, and thereafter, transmits the packet from the host.

Unfortunately, the above operations involved in carrying out this conventional push technique do not scale well with increased packet traffic and/or CPU threads requesting packet transmissions. This results, at least in part, from the fact that this conventional push technique utilizes significant amounts of NIC (e.g., on-die) memory for each such packet transmission/transaction. Additionally, depending upon the host bus protocol/internal transport architecture employed, intensive use of posted writes over the bus/internal transport mechanism (e.g., to the NIC memory) may be involved for each packet transmission/transaction. This may degrade host CPU performance, particularly when CPU instruction re-ordering occurs in a way that makes it difficult to match corresponding completed posted writes.

Additional disadvantages of this conventional push technique can become apparent when the transmit traffic is bursty, thereby generating significant amounts of such traffic in relatively short time intervals. For example, such bursty traffic can completely fill the NIC memory that is devoted to packet pushing transactions, thereby stalling CPU threads from being able to send additional packets to the NIC for transmission, until sufficient NIC memory space has been freed (e.g., after other packets currently stored in the NIC's memory have been transmitted from the host). This may result in significant performance degradation. This condition can have particularly pernicious affects on latency intolerant and/or critical traffic. Additional NIC memory can be provided to try to ameliorate this problem. However, adding NIC memory increases NIC cost.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
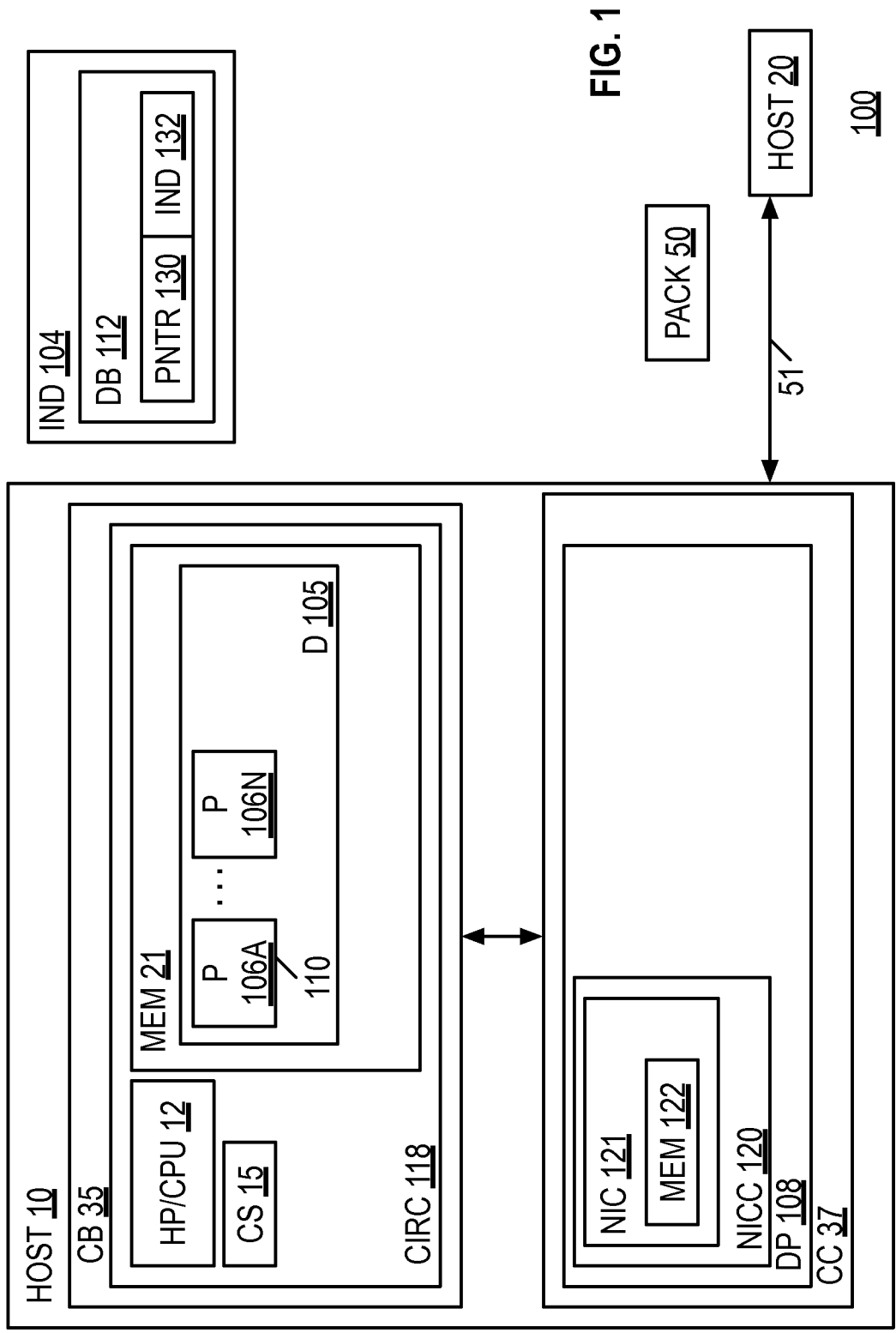
FIG. 1 illustrates a system embodiment.

FIG. 1 illustrates a system embodiment 100. System 100 may include one or more hosts 10 that may be communicatively coupled, via network 51, to one or more hosts 20. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction may comprise data and/or one or more commands. Additionally, in this embodiment, data may comprise one or more instructions and/or commands. In this embodiment, one or more hosts 10 may be remote (e.g., geographically remote), at least in part, from one or more hosts 20.

One or more hosts 10 may comprise one or more circuit boards 35 that may be communicatively coupled (e.g., via one or more not shown card slots and/or other interconnects that may be comprised, at least in part, in one or more boards 35) to one or more circuit cards 37. For example, although not shown in Figures, one or more circuit boards 35 may comprise one or more card slots and/or other interconnects. Also for example, one or more circuit cards 37 may comprise one or more mating interconnects that may be constructed so as to be able to be inserted into and/or mated with, at least in part, the one or more slots and/or interconnects of one or more circuit boards 35 so as to permit the one or more circuit boards 35 and circuit cards 37 (and/or one or more respective components thereof) to become electrically coupled to and/or physically mated with each other, at least in part.

In this embodiment, one or more circuit boards 35 may comprise, at least in part, circuitry 118. Circuitry 118 may comprise, at least in part, one or more single and/or multi-core host processors 12, one or more chipsets 15, and/or host memory 21. One or more chipsets 15 may communicatively couple, at least in part, one or more host processors 12 to memory 21, one or more circuit cards 37, one or more data processors 108, NICC 120, and/or one or more NIC 121.

Also in this embodiment, one or more circuit cards 37 may comprise, at least in part, one or more data processors 108. One or more data processors 108 may comprise, at least in part, network interface controller circuitry (NICC) 120 that may comprise, at least in part, one or more network interface controllers (NIC) 121. One or more NIC 121 may comprise, at least in part, memory 122.

In this embodiment, "circuitry" may be or comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, host processor, central processing unit, processor core, core, and/or controller each may be or comprise respective circuitry capable of performing, at least in part, one or more arithmetic and/or logical operations, and/or of executing, at least in part, one or more instructions. In this embodiment, a chipset may be or comprise one or more integrated circuit chips that may comprise, at least in part, circuitry that may be permit, at least in part, one or more host processors and/or memory to be communicatively coupled, at least in part. In this embodiment, an integrated circuit chip may be or comprise one or more microelectronic devices, substrates, and/or dies. Also in this embodiment, memory may be or comprise one or more of the following types of memories: semiconductor firmware memory, volatile memory, programmable memory, non-volatile memory, read only memory, electrically programmable memory, random access memory, flash memory, magnetic disk memory, optical disk memory, and/or other or later-developed computer-readable and/or writable memory.

Although not shown in the Figures, one or more hosts 10 and/or 20 each may comprise, at least in part, one or more a respective graphical user interface systems. Each of these graphical user interfaces systems may comprise, at least in part, e.g., one or more respective keyboards, pointing devices, and/or display systems, that may permit a human user to input commands to, and/or monitor the operation of, one or more hosts 10, one or more hosts 20, and/or system 100.

In this embodiment, an accessing of data may be or comprise, at least in part, one or more readings and/or writings of the data. Also in this embodiment, reading data may be or comprise, at least in part, one or more transactions and/or occurrences that may facilitate, involve, and/or result in, at least in part, obtaining and/or retrieval, at least in part, of the data (e.g., from memory). In this embodiment, writing data may be or comprise, at least in part, one or more transactions and/or occurrences that may facilitate, involve, and/or result in, at least in part, storing, at least temporarily and/or at least in part, of the data (e.g., in memory). In this embodiment, reading, writing, and/or accessing of data may comprise, at least in part, one or more direct memory access (DMA) operations and/or transactions.

One or more machine-readable program instructions may be stored, at least in part, in, e.g., memory 21 and/or 122. In operation of one or more hosts 10, these machine-readable instructions may be accessed and executed, at least in part, by circuitry 118, one or more host processors 12, one or more chipsets 15, one or more data processors 108, circuitry 120, and/or one or more NIC 121 (and/or one or more components thereof). When so access and/or executed, these one or more machine-readable instructions may result, at least in part, in circuitry 118, one or more host processors 12, one or more chipsets 15, one or more data processors 108, circuitry 120, and/or one or more NIC 121 (and/or one or more components thereof) performing, at least in part, the operations described herein as being performed by circuitry 118, one or more host processors 12, one or more chipsets 15, one or more data processors 108, circuitry 120, and/or one or more NIC 121 (and/or one or more components thereof).

In this embodiment, a portion or subset of an entity may comprise all or less than all of the entity. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions. In this embodiment, a kernel may be or comprise one or more operating system processes (e.g., that may (1) manage, intercept, and/or control, at least in part, one or more input/output (I/O) requests from one or more user application processes, and/or (2) translate and/or interpret, at least in part, one or more such I/O requests for execution, at least in part, by circuitry comprised in one or more hosts).

In this embodiment, a ring, queue, and/or buffer may comprise, at least in part, one or more locations (e.g., specified and/or indicated, at least in part, by one or more addresses) in memory in which data and/or one or more commands may be stored, at least temporarily. Furthermore, in this embodiment, a doorbell may embody, reference, indicate, be, and/or comprise, at least in part, data and/or one or more commands that, when written into one or more locations in memory, may (1) result, at least in part, in performance of one or more operations, and/or (2) indicate, at least in part, that one or more operations are to be performed, at least in part. In this embodiment, a descriptor may embody, reference, indicate, be, and/or comprise, at least in part, data and/or one or more commands that (1) may describe, at least in part, one or more packets, one or more locations (e.g., in memory) of one or more packets, and/or one or more characteristics and/or features of one or more packets, and/or (2) are to be performed on and/or involving, at least in part, one or more packets. For example, in this embodiment, a descriptor may (1) be or comprise, at least in part, one or more requests to perform one or more operations involving, at least in part, one or more packets, and/or (2) comprise, at least in part, one or more pointers to the one or more packets, and/or one or more indications of one or more lengths/sizes, types, etc. of the one or more packets. In this embodiment, a pointer may indicate, address, and/or specify, at least in part, one or more locations and/or one or more items in memory.

Although not shown in the Figures, without departing from this embodiment, some or all of various components (e.g., one or more data processors 108, NICC 120, one or more NIC 121, and/or memory 122, and/or one or more components thereof) of one or more circuit cards 37 may be comprised, at least in part, in one or more circuit boards 35, circuitry 118, one or more host processors 12, and/or one or more chipsets 15. Likewise, without departing from this embodiment, some or all of the components (e.g., one or more host processors 12, one or more chipsets 15, memory 21, and/or circuitry 118) of one or more circuit boards 35 may be comprised, at least in part, in one or more data processors 108, NICC 120, one or more NIC 121, and/or one or more circuit cards 37.

In this embodiment, one or more hosts 10, one or more data processors 108, NICC 120, and/or one or more NIC 121 may exchange one or more packets 50 with one or more hosts 20 via network 51 in accordance with one or more protocols that may comply and/or be compatible with, at least in part, an Ethernet protocol, and/or Transmission Control Protocol/Internet Protocol (TCP/IP) protocol. For example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Many different, additional, and/or other protocols may be used for such data and/or command exchange without departing from this embodiment (e.g., earlier and/or later-developed versions of the aforesaid, related, and/or other protocols).

For example, in this embodiment, circuitry 118 and/or one or more host processors 12 may make available to one or more data processors 108, one or more NIC 121, and/or NICC 120, one or more (and in this embodiment, a plurality of) portions 106A . . . 106N of data 105 for processing by one or more data processors 108, one or more NIC 121, and/or NICC 120. After and/or contemporaneously with provision of such data 105 and/or one or more portions 106A . . . 106N thereof, one or more data processors 108, one or more NIC 121, and/or NICC 120 may process such data 105 and/or one or more portions 106A . . . 106N thereof by, for example, including and/or transporting it in one or more packets 50 to one or more hosts 20.

For example, circuitry 118 and/or one or more host processors 12 may generate and/or store, at least in part, in memory 21, prior to (at least in part) its transmission in one or more packets 50 to one or more hosts 20, data 105 and/or one or more portions 106A . . . 106N thereof. In order to, for example, initiate, facilitate, and/or expedite processing of the data 105 and/or one or more portions 106A . . . 106N thereof by one or more data processors 108, one or more NIC 121, and/or NICC 120, circuitry 118 may provide, at least in part, one or more indications 104 that one or more portions (e.g., one or more portions 106A) of the data 105 may be available for processing by one or more data processors 108, one or more NIC 121, and/or NICC 120. Advantageously, in this embodiment, these one or more indications 104 may be provided, at least in part, prior to the entirety (e.g., all) 110 of the one or more portions 106A of data 105 actually being made available for processing by one or more data processors 108, one or more NIC 121, and/or NICC 120. In response to and/or based upon, at least in part, one or more indications 104, one or more data processors 108, one or more NIC 121, and/or NICC 120 may begin the processing of the one or more portions 106A of data 105.

For example, in this embodiment, the one or more indications 104 may comprise one or more doorbells 112 that may be written, at least in part, to memory 21. The one or more doorbells 112 may comprise (1) one or more pointers 130 to one or more portions 106A . . . 106N of data 105, and/or (2) one or more indicators 132 of one or more lengths/sizes of the one or more portions 106A . . . 106N pointed to by the one or more pointers 130.

Figure 2:
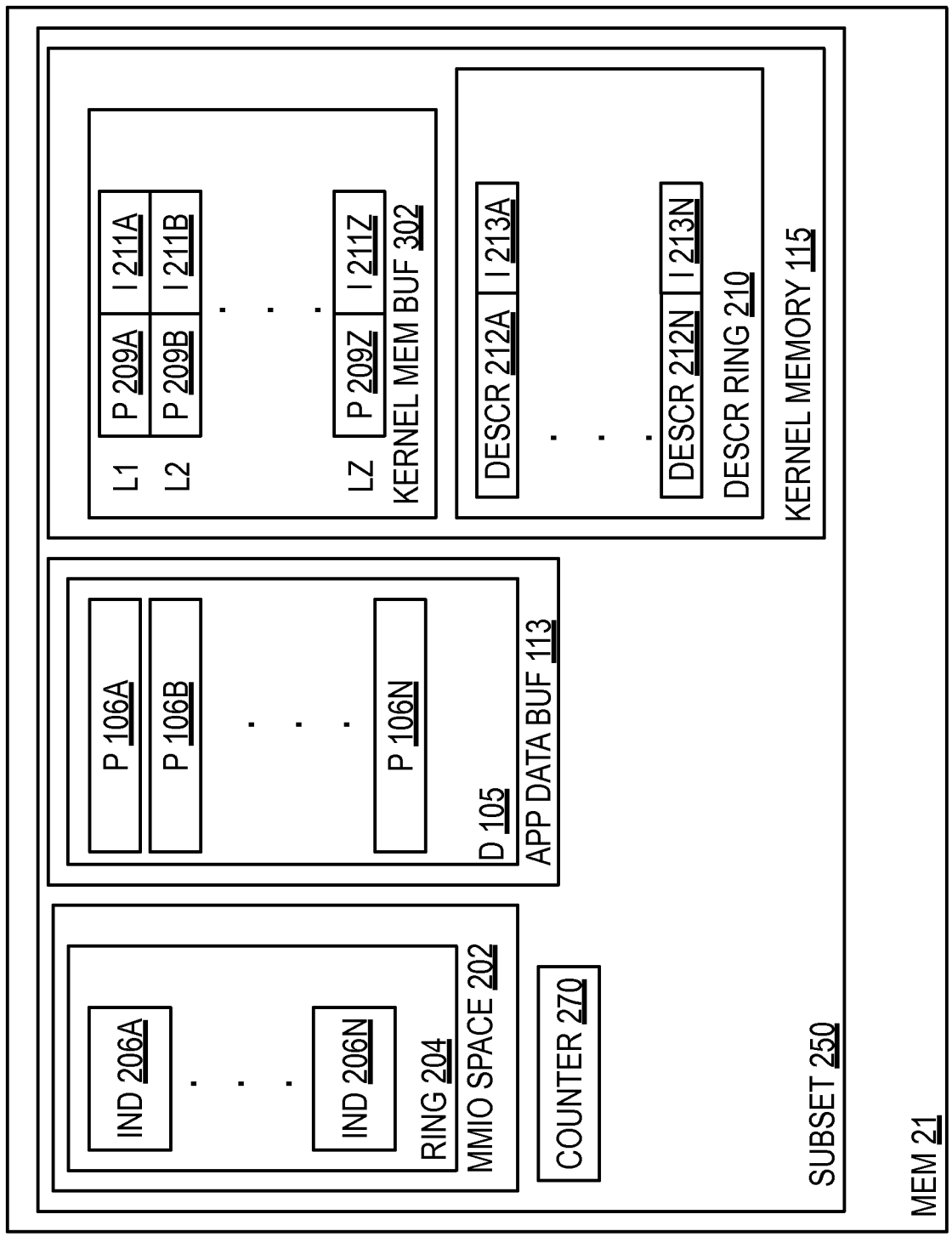
FIG. 2 illustrates features in an embodiment.

For example, as shown in FIG. 2, in this embodiment, one or more indications 104 may comprise one or more (and in this embodiment, a plurality of) indications 206A . . . 206N that may correspond, at least in part, to portions 106A . . . 106N of data 105. Circuitry 118 and/or one or more host processors 12 may write, at least in part, portions 106A . . . 106N of data 105 into one or more application data buffers 113 (e.g., one or more data buffers that may be associated with, assigned to, and/or used by, at least in part, one or more not shown user application processes executed, at least in part, by one or more processors 12) in one or more subsets 250 of memory 21. Prior to, at least in part, writing each of the respective portions 106A . . . 106N, circuitry 118 and/or one or more host processors 12 may write into respective sequential (and/or non-sequential) entries in one or more circular ring data structures 204 in one or more memory mapped I/O (MMIO) spaces 202 in one or more subsets 250 in memory 21, respective indications 206A . . . 206N.

In this embodiment, a memory mapped I/O space may be or comprise, at least in part, one or more contiguous and/or non-contiguous portions of memory that may be associated with, assigned to, and/or allocated to, at least in part, exclusively or non-exclusively, one or more hardware, firmware, and/or software devices for use in facilitating, implementing, signaling, requesting, accessing, and/or performing one or more I/O operations and/or transactions involving, at least in part, the one or more devices. In this embodiment, one or more MMIO spaces 202 may be associated, at least in part, one or more data processors 108, NICC 120, and/or one or more NIC 121.

In this embodiment, although not shown in the Figures, each of the indications 206A . . . 206N may comprise, at least in part, respective components, fields, and/or values that may correspond to, be similar, or be analogous to, at least in part, the respective components, fields, and/or values of one or more indications 104. Thus, although not shown in the Figures, the respective indications 206A . . . 206N may comprise, at least in part, respective doorbells, pointers, and/or size indictors that may be for ringing of respective doorbells with respective to, respectively point to, and/or respectively indicate the respective sizes of respective portions 106A . . . 106N.

The writing, at least in part, of the respective indications 206A . . . 206N into the respective entries in the one or more rings 204, may embody, result in, and/or constitute, at least in part, one or more respective doorbell rings, to and/or associated with (at least in part) one or more data processors 108, NICC 120, and/or one or more NIC 121, with respect to respective portions 106A . . . 106N of the data 105 that may be associated with, at least in part, the respective indications 206A . . . 206N. In this embodiment, the ringing of a doorbell that is associated with an entity may comprise and/or involve, at least in part, the writing one or more values (e.g., one or more doorbells) to one or more memory locations that may result in and/or trigger, at least in part, the entity performing, at least in part, one or more operations and/or actions. Additionally or alternatively, although not shown in the Figures, without departing from this embodiment, one or more indications 206A . . . 206N and/or one or more doorbells 112 may be written into one or more memory locations in, for example, one or more data processors 108, NICC 120, one or more NIC 121, and/or elsewhere in one or more hosts 10.

In response, at least in part, to the ringing of the respective doorbells associated with, at least in part, respective portions 106A . . . 106N, one or more data processors 108, NICC 120, and/or one or more NIC 121 may begin respective processing of the respective portions 106A . . . 106N of data 105 that may be associated, at least in part, with the respective doorbells. The respective processing of one or more respective portions (e.g., 106A) of the data 105 may begin prior to these one or more respective portions 106A (and/or one or more other respective portions 106B . . . 106N) being actually available for their respective processing.

For example, circuitry 118 and/or one or more host processors 12 may write, at least in part, one or more indications 206A into one or more rings 204 prior to, at least in part, writing (and thereby, making available for their respective processing) one or more portions 106A (and/or one or more of the portions 106B . . . 106N) of data 105 into one or more buffers 113. In response, at least in part, to the one or more doorbell rings that result, at least in part, from the writing, at least in part, of one or more indications 206A into one or more rings 204, one or more data processors 108, NICC 120, and/or one or more NIC 121 may begin the reading and/or other processing of one or more portions 106A associated with one or more indications 206A, prior to the entirety of one or more portions 106A (and/or one or more of the portions 106B . . . 106N) being fully written into one or more buffers 113 by circuitry 118 and/or one or more processors 12.

Additionally or alternatively, without departing from this embodiment, circuitry 118 and/or one or more processors 12 may write, at least in part, one or more of the other portions 106B . . . 106N of data 105 into one or more buffers 113 contemporaneously with or prior to, at least in part, the processing of one or more portions 106A by one or more data processors 108, NICC 120, and/or one or more NIC 121. This may make these one or more of portions 106B . . . 106N available for respective processing by one or more data processors 108, NICC 120, and/or one or more NIC 121 contemporaneously with or prior to (respectively), at least in part, the processing of one or more portions 106A by one or more data processors 108, NICC 120, and/or one or more NIC 121.

Before, contemporaneously with, or after, at least in part, the respective writing, at least in part, of respective indications 206A . . . 206N into one or more rings 204, circuitry 118 and/or one or more processors 12 may write, at least in part, respective descriptors 212A . . . 212N into one or more descriptor rings 210 in kernel memory/memory space 115 in one or more subsets 250 of memory 21. These respective descriptors 212A . . . 212N may be associated with and/or correspond to, at least in part, the respective indicators 206A . . . 206N and/or respective portions 106A . . . 106N of data 105. One or more data processors 108, NICC 120, and/or one or more NIC 121 may read, at least in part, these respective descriptors 212A . . . 212N in parallel and/or contemporaneously with, at least in part, reading of the respective indications 206A . . . 206N and/or respective portions 106A . . . 106N by one or more processors 108, NICC 120, and/or one or more NIC 121. After reading, at least in part, one or more respective indications (e.g., 206A) and/or one or more respective descriptors (e.g., 212A) associated, at least in part, with one or more respective portions (e.g., 106A) of data 105, one or more data processors 108, NICC 120, and/or one or more NIC 121 may read, at least in part, the one or more respective associated portions 106A of data 105.

For example, in this embodiment, one or more rings 210 and/or the respective memory locations comprised in one or more rings 210 may be pre-allocated, at least in part, and/or pre-determined by circuitry 118 and/or one or more processors 12. Such pre-allocation and/or pre-determination may be such that the relationship between respective indications 206A . . . 206N and their respective corresponding and/or associated descriptors 212A . . . 212N, as well as, the respective memory locations in one or more rings 210 storing such respective corresponding and/or associated descriptors 212A . . . 212N may be pre-determined and/or available, at least in part, to one or more data processors 108, NICC 120, and/or one or more NIC 121.

In this embodiment, the descriptors 212A . . . 212N of the respective portions 106A . . . 106N of data 105 may comprise, reference, and/or indicate, at least in part, respective descriptor information 213A . . . 213N that may indicate, at least in part, whether the respective descriptors 212A . . . 212N are valid. For example, as written into one or more rings 210 by circuitry 118 and/or one or more processors 12, the respective information (e.g., 213A) comprised in one or more respective descriptors (e.g., 212A) may be (e.g., Boolean logically) set to indicate that the one or more respective descriptors 212A are valid. However, after one or more data processors 108, NICC 120, and/or one or more NIC 121 have read and/or processed these one or more respective descriptors 212A and/or the one or more respective portions 106A of data 105 that may be associated with them, then one or more data processors 108, NICC 120, and/or one or more NIC 121 may (1) modify (e.g., by Boolean logically or otherwise resetting) the respective information 213A of the one or more respective descriptors 212A to indicate that the one or more respective descriptors are no longer valid (i.e., are invalid), and (2) write the one or more respective descriptors 212A, whose respective information 213A has been thus modified, back into the same memory location or locations in one or more rings 210 from which the one or more respective descriptors 212A were read. This may overwrite the memory location or locations with the modified one or more descriptors 212A. By thus modifying and/or writing the thus modified one or more descriptors 212A back into one or more rings 210, this may indicate, at least in part, to circuitry 118 and/or one or more processors 12 that (1) the one or more descriptors 212A in one or more rings 210 are no longer valid and (2) have been made available to the circuitry 118 and/or one or more processors 12 for reuse (e.g., to be overwritten with one or more new descriptors 212A by circuitry 118 and/or one or more processors 12, as appropriate).

In this embodiment, after reading, at least in part, one or more respective descriptors (e.g., 212A), one or more data processors 108, NICC 120, and/or NIC 121 may examine, at least in part, the respective information (e.g., 213A) comprised and/or associated, at least in part, with the one or more respective descriptors 212A to determine, at least in part, whether the one or more respective descriptors 212A are valid. If the respective information 213A indicates that the one or more respective descriptors 212A may be invalid, one or more data processors 108, NICC 120, and/or NIC 121 may (1) drop (e.g., no longer continue processing) the one or more descriptors 212A and/or their associated one or more portions 106A of data 105, and/or (2) proceed to processing in connection with one or more other and/or different transmit queues as will be described later in connection with FIG. 3.

Returning to FIG. 2, conversely, if the respective information 213A indicates that the one or more respective descriptors 212A are valid, one or more data processors 108, NICC 120, and/or NIC 121 may process, at least in part, one or more associated portions 106A of data 105 pointed to by one or more pointers comprised in one or more associated indications 206A in a manner consistent with and/or requested by, at least in part, one or more descriptors 212A. In this example, one or more descriptors 212A may request, at least in part, transmission, at least in part, in one or more packets 50 of one or more portions 106A (alone and/or together with one or more other portions 106B . . . 106N) of data 105 to one or more hosts 20 by one or more processors 108, NICC 120, and/or one or more NIC 121. Accordingly, in response, at least in part to these one or more requests, one or more processors 108, NICC 120, and/or one or more NIC 121 may store, at least temporarily and/or at least in part, in local memory 122, the one or more portions 106A . . . 106N of data 105 that may be so requested to be transmitted in one or more packets 50. One or more processors 108, NICC 120, and/or one or more NIC 121 may build, at least in part, one or more packets 50 so as to comprise the requested portions 106A . . . 106N. After building the one or more packets 50, one or more processors 108, NICC 120, and/or one or more NIC 121 may transmit the one or more packets 50 to one or more hosts 20 via one or more networks 51.

Toward this end, in this embodiment, one or more descriptors 212A (and/or one or more of the other descriptors 212B . . . 212N) may indicate, at least in part, a total number of portions 106A . . . 106N and/or total amount of data 105 that may be requested to be transmitted in one or more packets 50. One or more processors 108, NICC 120, and/or one or more NIC 121 may maintain, at least in part, in memory 21 and/or memory 122, one or more counters (and/or other suitable data structures) 270 to be used by one or more processors 108, NICC 120, and/or one or more NIC 121 to determine, at least in part, whether one or more processors 108, NICC 120, and/or one or more NIC 121 have completely processed (e.g., to successfully build one or more packets 50) all of the total requested number of portions 106A . . . 106N and/or requested amount of data 105. As each of the requested portions 106A . . . 106N of data 105 is read (e.g., into memory 122), one or more processors 108, NICC 120, and/or one or more NIC 121 may increment (or decrement), as appropriate, the one or more counters 270 until the total requested number (e.g., as indicated in the one or more descriptors 212A) of portions or amount of data 105 has been processed.

Additionally or alternatively, without departing from this embodiment, one or more data processors 108, NICC 120, and/or one or more NIC 121 may initiate reading of one or more respective associated portions 106A of data 105, descriptors 212A, and/or information 213A, such that, the reading occurs contemporaneously, at least in part, with the writing, by the circuitry 118 and/or one or more processors 12, into one or more buffers 113 and/or subsets 250 of these one or more respective associated portions 106A of data 105, descriptors 212A, and/or information 213A. For example, in order to accelerate the processing of one or more portions 106A of data 105, circuitry 118 and/or one or more processors 12 may write, at least in part, one or more indications 206A into one or more rings 204 prior to, at least in part, circuitry 118 and/or one or more processors 12 initiating and/or completing the writing, at least in part, of the one or more respective associated portions 106A of data 105, descriptors 212A, and/or information 213A into one or more memory subsets 250. In response, at least in part, to the one or more doorbell rings resulting, at least in part, from writing, at least in part, one or more indications 206A, one or more processors 108, NICC 120, and/or one or more NIC 121 may begin reading, at least in part, these one or more respective associated portions 106A of data 105, descriptors 212A, and/or information 213A, prior to the initiation and/or completion of such writing by circuitry 118 and/or one or more processors 12. Unless one or more processors 108, NICC 120, and/or one or more NIC 121 may be capable of reading data from memory 21 more quickly than circuitry 118 and/or one or more processors 12 may be capable of writing such data into the memory 21, the foregoing operations may be unlikely to result in undesirable amount of stalling by one or more processors 108, NICC 120, and/or one or more NIC 121 (e.g., to wait for writing of valid data into memory 21 so that it can be read by one or more processors 108, NICC 120, and/or one or more NIC 121).

Alternatively or additionally, without departing from this embodiment, depending upon the particular type of one or more not shown operating systems (and/or features, operations, and/or limitations thereof) that may be executed in one or more hosts 10 by one or more processors 12, one or more processors 12 may copy, at least in part, data 105 and/or one or more portions 106A . . . 106N of data 105 into one or more host kernel memory buffers 302 of one or more operating system kernel memory spaces 115. For example, in this alternative and/or additional arrangement, except as stated otherwise herein, the operations performed, at least in part, by the one or more processors 108, NICC 120, one or more NIC 121, one or more processors 12, and/or circuitry 118 may be identical, similar, and/or analogous to, at least in part, those described previously as being performed by these components in this embodiment. However, in this alternative and/or additional arrangement, these one or more not shown operating systems may be of a type in which, prior to being able to access the data 105 and/or one or more portions 106A . . . 106N thereof, the circuitry 118 and/or one or more processors 12 may copy, at least in part, the data 105 and/or one or more portions 106A . . . 106N into the host kernel memory 115. More specifically, in this embodiment, after (at least in part) providing one or more respective doorbell rings to one or more processors 108, NICC 120, and/or one or more NIC 121 by writing, at least in part, one or more respective indications 206A . . . 206N into one or more rings 204, circuitry 118 and/or one or more processors 12 may write one or more respective corresponding descriptors 212A . . . 212N into one or more rings 210. Contemporaneously (e.g., in parallel), at least in part, with the writing of each of these respective descriptors 212A . . . 212N into one or more rings 210, circuitry 118 and/or one or more processors 12 may write, at least in part, (1) respective corresponding portions 209A . . . 209Z of data 105, and/or (2) respective corresponding information fields 211A . . . 211Z into respective locations L1 . . . LZ in memory 115, with the corresponding information fields 211A . . . 211Z in each of the respective locations L1 . . . LZ being written therein last. Thus, in this arrangement, the one or more respective descriptors 212A . . . 212N may correspond to and/or describe, at least in part, the one or more respective portions 209A . . . 209Z of data 105. Contemporaneously (e.g., in parallel), at least in part, with the writing, at least in part, of the respective descriptors 212A . . . 212N and/or the respective corresponding portions 209A . . . 209Z of data 105 (and their respective corresponding information fields 211A . . . 211Z) into memory 115, one or more processors 108, NICC 120, and/or one or more NIC 121 may read these items from the memory 115.

In this arrangement, the respective information fields 211A . . . 211N may indicate, at least in part, respective validity (in a manner similar and/or analogous to, at least in part, that in which the respective information 213A . . . 213N may be employed to indicate validity of the descriptors 212A . . . 212N) of the respective corresponding portions 209A . . . 209N of data 105 associated with them in the respective locations L1 . . . LZ. Additionally or alternatively, the information fields 211A . . . 211N may be or comprise other and/or additional types of information, such as, for example, the respective numbers of valid bytes, respective locations of the corresponding descriptors, etc. Based at least in part upon examination of the respective information 211A . . . 211Z, one or more processors 108, NICC 120, and/or one or more NIC 121 may determine whether the respective portions 209A . . . 209Z associated with them may be valid for processing by the one or more processors 108, NICC 120, and/or one or more NIC 121. Based upon such determination, one or more processors 108, NICC 120, and/or one or more NIC 121 may process the respective corresponding portions 209A . . . 209Z in a manner similar and/or analogous to, at least in part, the manner in which the descriptors 212A . . . 212N may be processed by one or more processors 108, NICC 120, and/or one or more NIC 121 based at least in part upon their respective corresponding information 213A . . . 213N.

After fully processing one or more valid portions 209A . . . 209Z of data 105 for transmission from the one or more hosts 10 in one or more packets 50, the one or more processors 108, NICC 120, one or more NIC 121, one or more processors 12, and/or circuitry 118 may modify, at least in part, their respective information 211A . . . 211Z to indicate, at least in part, that they are no longer valid. Such modification may be similar and/or analogous to, at least in part, the manner (described previously) in which respective information 213A . . . 213N may be so modified and/or written back into one or more rings 210 to indicate that they are no longer valid. After being so modified, the now invalid portions 209A . . . 209Z (and their, now modified, corresponding respective information 211A . . . 211Z) may be written back into their respective locations 209A . . . 209Z. This may release them for reuse by circuitry 118 and/or one or more processors 12.

Thus, in this alternative and/or additional arrangement, circuitry 118 and/or one or more processors 12 may write, into one or more host memory subsets 250, (1) one or more portions 209A . . . 209Z, (2) one or more descriptors 212A . . . 212N of one or more portions 209A . . . 209Z, and/or (3) information 211A . . . 211Z and/or information 213A . . . 213N that may be associated, at least in part, these contents of the one or more subsets 250. Such information 211A . . . 211Z and/or information 213A . . . 213N may indicate, at least in part, whether their respective corresponding portions 209A . . . 209Z and/or respective corresponding descriptors 212A . . . 212N may be valid. In this arrangement, the one or more processors 108, NICC 120, and/or one or more NIC 121 may initiate reading of the one or more respective portions 209A . . . 209Z, the respective corresponding descriptors 212A . . . 212N, and/or the information 211A . . . 211Z and/or 213A . . . 213N such that the reading may occur contemporaneously, at least in part, with the writing by the circuitry 118 and/or one or more processors 12 into the one or more subsets 250 of the one or more respective portions 209A . . . 209Z, the respective corresponding descriptors 212A . . . 212N, and/or the information 211A . . . 211Z and/or 213A . . . 213N. Alternatively or additionally, without departing from this arrangement and/or embodiment, the one or more descriptors 212A . . . 212N may be written into the one or more rings 210 after, at least in part, one or more respective corresponding portions 209A . . . 209Z have been written, at least in part, into one or more host kernel memory buffers 302.

As stated previously, in this embodiment, the respective indications 206A . . . 206N (and/or doorbells comprised therein) may comprise and/or indicate, at least in part, (1) one or more respective pointers to the one or more respective locations of the one or more respective corresponding portions 106A . . . 106N and/or 209A . . . 209Z (as the case may be) of data 105 that may be associated with the respective indications 206A . . . 206N, and/or (2) the respective amount of data comprised in these respective corresponding portions 106A . . . 106N and/or 209A . . . 209Z. Additionally or alternatively, in this embodiment, the respective indications 206A . . . 206N may comprise, at least in part, one or more respective values that may be and/or indicate, at least in part, one or more respective numbers of these portions of data 105 that are to be processed by one or more processors 108, NICC 120, and/or NIC 121 in order to generate one or more packets 50. These one or more values may be or comprise, for example, one or more counter values 270 that may be used in a manner identical, similar, or analogous to that described previously.

In this embodiment, depending upon the particular implementation, in order to facilitate, at least in part, data buffer cache line alignment and/or host system bus/interconnect transmission efficiency/compatibility, each of the indications 206A . . . 206N may be 64 bits in length, with each respective pointer being 58 bits in length, and the respective data amount indicator being 6 bits in length. Thus, for example, doorbell 112 and/or indication 104 (see FIG. 1) may be 64 bits in length, one or more pointers 130 may be 58 bits in length, and one or more indications 132 may be 6 bits in length. Additionally, in this embodiment, each of the one or more portions 106A . . . 106N may be 64 bytes in length. Also, in this embodiment, each of the one or more portions 209A . . . 209Z may be 63 bytes in length, with each of the corresponding information fields 211A . . . 211Z being 1 byte in length. Similar considerations may be taken into account in configuring the respective sizes of the descriptors 212A . . . 212N and/or respective information 213A . . . 213N. Thus, after being written into one or more buffers 115, taken together, portions 209A . . . 209Z may comprise all of the data 105, but it may be segmented into portions 209A . . . 209Z in a manner that may be different, at least in part, to the segmentation of data 105 in portions 106A . . . 106N.

In this embodiment, the indications 206A . . . 206N may comprise one or more subsets of the information that may be comprised in their corresponding respective descriptors 212A . . . 212N (e.g., as illustrated in representative indication 104 in FIG. 1). Additionally or alternatively, without departing from this embodiment, the respective indications 206A . . . 206N comprise all of the respective information that may be comprised in their corresponding respective descriptors 212A . . . 212N. For example, an exemplary indication 402 may comprise one or more doorbells 404. The one or more doorbells 404 may comprise one or more pointers 406 (e.g., that may serve an analogous purpose to the purpose of one or more pointers 130), one or more descriptors 408, and/or one or more indicators 410 (e.g., that may serve an analogous purpose to the purpose of one or more indications 132). One or more descriptors 408 may be or comprise one or more of the corresponding descriptors (e.g., 212A) that may correspond to the one or more indications (e.g., 206A).

Of course, depending upon the particular implementation, the contents, numbers, sizes, configurations, etc. of the portions 106A . . . 106N and/or 209A . . . 209Z of data 105, indications 206A . . . 206N, descriptors 212A . . . 212N, information 211A . . . 211Z, information 213A . . . 213N may vary, without departing from this embodiment. Accordingly, the particular parameters and/or characteristics of these items described and illustrated herein are merely examples.

Figure 3:
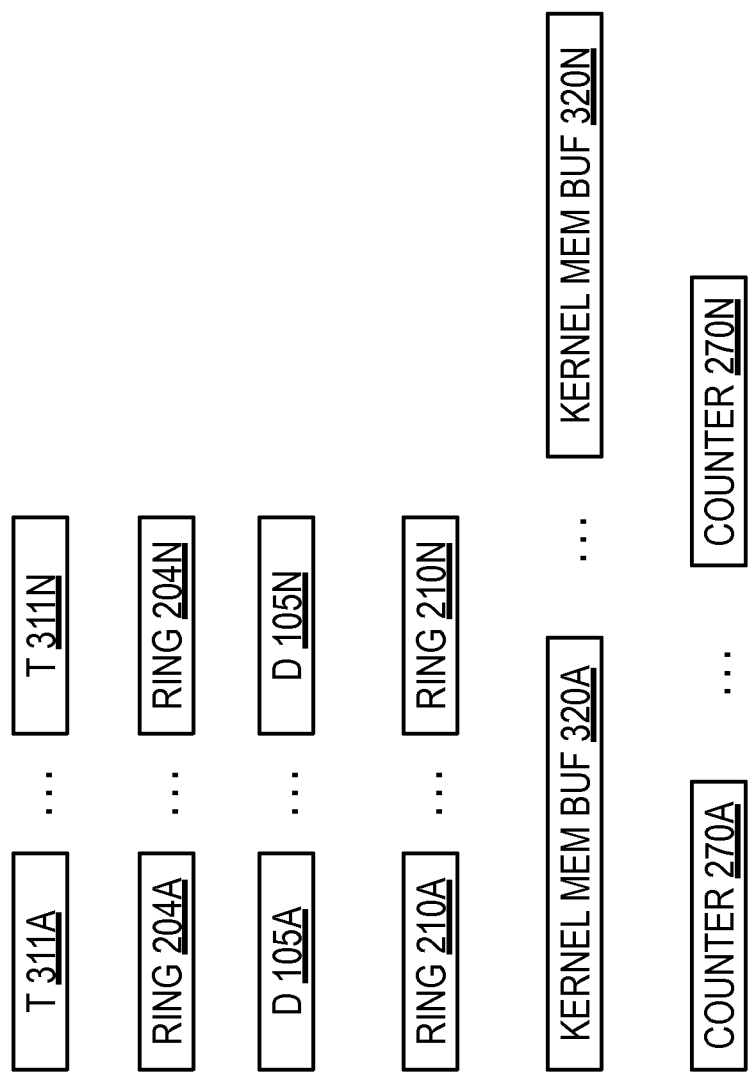
FIG. 3 illustrates features in an embodiment.
Figure 4:
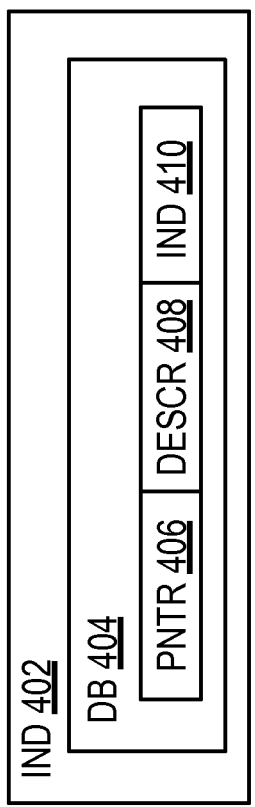
FIG. 4 illustrates features in an embodiment.

Turning now to FIG. 3, one or more processors 12 may execute, at least in part, program/process threads 311A . . . 311N. The respective threads 311A . . . 311N may maintain respective sets of data structures that may be used in this embodiment to facilitate transmission of one or more packets 50 that may comprise respective data 105A . . . 105N generated, at least in part, by the threads 311A . . . 311N. For example, threads 311A . . . 311N may be assigned to, associated with, generate, and/or maintain, at least in part, one or more respective doorbell/indication rings 202A . . . 202N, one or more respective descriptor rings 210A . . . 210N, one or more respective kernel data buffers 320A . . . 320N, and/or one or more respective counters 270A . . . 270N. The respective rings 202A . . . 202N may be used by the respective threads 311A . . . 311N to implement and/or facilitate, at least in part, for the respective threads 311A . . . 311N, features and/or operations similar and analogous to, at least in part, the features and/or operations implemented and/or facilitated, at least in part, by one or more rings 204. The respective rings 210A . . . 210N may be used by the respective threads 311A . . . 311N to implement and/or facilitate, at least in part, for the respective threads 311A . . . 311N, features and/or operations similar and analogous to, at least in part, the features and/or operations implemented and/or facilitated, at least in part, by one or more rings 210. The respective buffers 320A . . . 320N may be used by the respective threads 311A . . . 311N to implement and/or facilitate, at least in part, for the respective threads 311A . . . 311N, features and/or operations similar and analogous to, at least in part, the features and/or operations implemented and/or facilitated, at least in part, by one or more buffers 302. The counters 270A . . . 270N may be used by the respective threads 311A . . . 311N to implement and/or facilitate, at least in part, for the respective threads 311A . . . 311N, features and/or operations similar and analogous to, at least in part, the features and/or operations implemented and/or facilitated, at least in part, by one or more rings counters 270.

Thus, in a first example in this embodiment, an apparatus is provided that may be usable, at least in part, in association with at least one host. The apparatus may comprise circuitry to provide, at least in part, at least one indication that at least one portion of data is available for processing by at least one data processor. The at least one indication may be provided, at least in part, prior to an entirety of the at least one portion of the data being available for the processing by the at least one data processor. The at least one data processor may begin the processing of the at least one portion of the data in response, at least in part, to the at least one indication.

In a second example in this embodiment that may comprise some or all of the elements of the first example, (1) the circuitry may comprise, at least in part, at least one host processor, (2) at least one circuit board may comprise, at least in part, host memory and the at least one host processor, (3) at least one data processor may comprise, at least in part, NICC, (4) at least one circuit card may comprise, at least in part, the NICC, (5) the at least one circuit card may be communicatively coupled, at least in part, to the at least one circuit board, (6) the at least one indication may comprise at least one doorbell that is to be written, at least in part, to the host memory, and/or (7) the at least one doorbell may comprise (a) at least one pointer to the at least one portion of the data, and/or (b) at least one indicator to indicate, at least in part, at least one size of the at least one portion of the data.

In a third example in this embodiment that may comprise some or all of the elements of the any of the preceding examples, the circuitry may write, at least in part, the at least one indication to at least one MMIO space in host memory. In this third example, the at least one MMIO space may be associated, at least in part, with the at least one data processor. The data may comprise the at least one portion of the data and at least one other portion of the data. The at least one indication may comprise at least one pointer to the at least one portion of the data. The at least one indication may indicate that both of the at least one portion of the data and the at least one other portion of the data may be available for the processing by the at least one data processor. The at least one data processor may begin the processing of the at least one portion of the data prior to the at least one other portion of the data being actually available for the processing by the at least one data processor. The circuitry may make the at least one other portion of the data available, at least in part, for the processing by the at least one data processor contemporaneously, at least in part, with the processing of the at least one portion of the data by the at least one data processor.

In a fourth example that may comprise some or all of the elements of any of the preceding examples, the circuitry may write into at least one subset of host memory: (1) the at least one portion of the data, (2) at least one descriptor of the at least one portion of the data, and/or (3) information associated, at least in part, with contents of the at least one subset of the host memory. The information may indicate, at least in part, whether the at least one portion of the data and the at least one descriptor written in the at least one subset of the host memory may be valid. The at least one data processor may initiate reading of the at least one portion of the data, the at least one descriptor, and the information, such that the reading may occur contemporaneously, at least in part, with writing by the circuitry into the at least one subset of the host memory of the at least one portion of the data, the at least one descriptor, and the information.

In a fifth example that may comprise some or all of the elements of the fourth example, the at least one subset of the host memory may comprise at least one pre-allocated memory ring in host kernel memory to store the at least one descriptor, and at least one host kernel memory buffer to store the at least one portion of the data. The at least one descriptor may be written into the at least one pre-allocated memory ring after the at least one portion of the data has been written into the at least one host kernel memory buffer. The at least one indication may comprise at least one doorbell that may be written into at least one doorbell ring associated, at least in part, with at least one data processor. The at least one data processor may examine the information to determine, at least in part, whether the at least one descriptor and the at least one portion of the data may be valid.

In a sixth example that may comprise some or all of the elements of the fifth example, the information may comprise (1) respective descriptor information to indicate, at least in part, whether the at least one descriptor may be valid, and/or (2) respective data portion information to indicate, at least in part, whether the at least one portion of the data may be valid. After the at least one data processor has processed the at least one portion of the data and the at least one descriptor, the at least one data processor may modify the respective data portion information and the respective descriptor information to indicate that the at least one portion of the data and the at least one descriptor may no longer be valid and may have been made available to the circuitry for reuse.

In a seventh example that may comprise some or all of the elements of the fifth example, the circuitry may copy the at least one portion of the data from at least one application buffer into the at least one host kernel memory buffer. The at least one indication may indicate, at least in part: (1) at least one location of the at least one portion of the data in the at least one host kernel memory buffer, and (2) a number of portions of the data to be processed by the at least one data processor. The at least one data processor may maintain a counter to be used in determining, at least in part, whether the at least one data processor has completely processed all of the number of portions of the data.

In an eighth example of this embodiment, computer-readable memory is provided that stores one or more instructions that when executed by a machine results in the performance of operations that may comprise any combination of any of the operations performed by the apparatus (and/or by any one or any combination of any of the components thereof) in any of the preceding examples. In a ninth example of this embodiment, a method is provided that may comprise (1) any combination of any of the operations performed by the apparatus (and/or by any one or any combination of any of the components thereof) in any of the preceding examples, and/or (2) any combination of any of the operations that may be performed by execution of the one or more instructions stored in the computer-readable memory of the eighth example of this embodiment.

In a tenth example of this embodiment, means may be provided to carry out any of, and/or any combination of, the operations that may be performed by the method, apparatus, computer-readable memory, in any of the preceding examples. In an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment).

In a twelfth example of this embodiment that may comprise some or all of the elements of any of the preceding examples, the at least one indication may comprise at least one doorbell that may be written, at least in part, to the host memory. The at least one doorbell may comprise (1) at least one pointer to the at least one portion of the data, (2) at least one descriptor of the at least one portion of the data, and (3) at least one indicator to indicate at least in part, at least one size of the at least one portion of the data.

Advantageously, the operations of this embodiment may process and/or transmit packet data with less latency than a conventional pull technique may introduce to process and/or transmit packet data. Further advantageously, this embodiment may scale well, and/or better, with increased packet traffic and/or CPU threads requesting packet transmission, than may be true of a conventional push technique.

Yet further advantageously, this embodiment may exhibit improved CPU, CPU thread, host memory, and/or host system performance compared to the foregoing conventional techniques, depending upon the particular host bus protocol/internal transport architecture employed. This may be especially true in the case of bursty traffic. Additionally, when this embodiment is employed, significantly increased NIC memory (and/or associated memory costs) may not be necessitated.

Many other and/or additionally modifications, variations, and/or alternatives are possible. Accordingly, the claims are intended to embrace all such alternatives, modifications, and/or variations.

What is claimed is:

1. An apparatus usable, at least in part, in association with at least one host, the apparatus comprising:
   circuitry to provide, at least in part, at least one indication that at least one portion of data is available for processing by at least one data processor, the at least one indication to be provided, at least in part, prior to an entirety of the at least one portion of the data being available for the processing by the at least one data processor, the at least one data processor to begin the processing in response, at least in part, to the at least one indication;
   the circuitry also to provide information in at least one descriptor, the at least one descriptor to be written in at least one memory location, the information to be logically set to indicate, at least in part, whether the at least one descriptor is valid, the at least one descriptor being associated with the at least one portion of the data;
   wherein, after the at least one descriptor has been processed at least in part, the at least one descriptor is to be modified by resetting the information to indicate, at least in part, that the at least one descriptor is available to be overwritten, at least in part, and after the resetting, the at least one descriptor, as modified, is to overwrite the at least one memory location; and
   also wherein:
      determination by the circuitry that the information indicates, at least in part, that the at least one descriptor is no longer valid, is to result, at least in part, in the at least one data processor discontinuing processing of the at least one descriptor and the at least one portion of the data that is associated with the at least one descriptor; and
      the circuitry is to provide, at least in part, the at least one indication by writing the at least one indication into at least one circular ring data structure entry in a circular ring data structure prior to, at least in part, an initiation, at least in part, by circuitry of writing of the at least one portion of the data, the at least one descriptor, and the information.

2. The apparatus of claim 1, wherein:
   the circuitry comprises, at least in part, at least one host processor;
   at least one circuit board comprises, at least in part, host memory and the at least one host processor;
   the at least one data processor comprises, at least in part, network interface controller (NIC) circuitry (NICC);
   at least one circuit card comprises, at least in part, the NICC;
   the at least one circuit card is to be communicatively coupled, at least in part, to the at least one circuit board;
   the at least one indication comprises at least one doorbell that is to be written, at least in part, to the host memory; and
   the at least one doorbell comprises:
      at least one pointer to the at least one portion of the data; and
      at least one indicator to indicate, at least in part, at least one size of the at least one portion of the data.

3. The apparatus of claim 1, wherein:
   the circuitry is to write, at least in part, the at least one indication to at least one memory mapped input/output (MMIO) space in host memory, the at least one MMIO space being associated, at least in part, with the at least one data processor;
   the data comprises the at least one portion of the data and at least one other portion of the data;

the at least one indication comprises at least one pointer to the at least one portion of the data;

the at least one indication is to indicate that both of the at least one portion of the data and the at least one other portion of the data are available for the processing by the at least one data processor;

the at least one data processor is to begin the processing of the at least one portion of the data prior to the at least one other portion of the data being actually available for the processing by the at least one data processor; and the circuitry is to make the at least one other portion of the data available, at least in part, for the processing by the at least one data processor contemporaneously, at least in part, with the processing of the at least one portion of the data by the at least one data processor.

4. The apparatus of claim 1, wherein:

the circuitry is to write into at least one subset of host memory:

the at least one portion of the data;

the at least one descriptor; and the information, the information also being associated, at least in part, with contents of the at least one subset of the host memory, the information indicating, at least in part, whether the at least one portion of the data and the at least one descriptor written in the at least one subset of the host memory are valid;

the at least one data processor is to initiate reading of the at least one portion of the data, the at least one descriptor, and the information, such that the reading is to occur contemporaneously, at least in part, with writing by the circuitry into the at least one subset of the host memory of the at least one portion of the data, the at least one descriptor, and the information.

5. The apparatus of claim 4, wherein:

the at least one subset of the host memory comprises:

at least one pre-allocated memory ring in host kernel memory to store the at least one descriptor; and at least one host kernel memory buffer to store the at least one portion of the data;

the at least one descriptor is written into the at least one pre-allocated memory ring after the at least one portion of the data has been written into the at least one host kernel memory buffer;

the at least one indication comprises at least one doorbell that is to be written into at least one doorbell ring associated, at least in part, with the at least one data processor; and the at least one data processor is to examine the information to determine, at least in part, whether the at least one descriptor and the at least one portion of the data are valid.

6. The apparatus of claim 5, wherein:

the information comprises:

respective descriptor information to indicate, at least in part, whether the at least one descriptor is valid;

respective data portion information to indicate, at least in part, whether the at least one portion of the data is valid;

after the at least one data processor has processed the at least one portion of the data and the at least one descriptor, the at least one data processor is to modify the respective data portion information and the respective descriptor information to indicate that the at least one portion of the data and the at least one descriptor are no longer valid and have been made available to the circuitry for reuse.

7. The apparatus of claim 5, wherein:

the circuitry is to copy the at least one portion of the data from at least one application buffer into the at least one host kernel memory buffer;

the at least one indication is to indicate, at least in part:

at least one location of the at least one portion of the data in the at least one host kernel memory buffer; and a number of portions of the data to be processed by the at least one data processor; and the at least one data processor is to maintain a counter to be used in determining, at least in part, whether the at least one data processor has completely processed all of the number of portions of the data.

8. A method implemented, at least in part, in association with at least one host, the method comprising:

providing, at least in part, by circuitry, at least one indication that at least one portion of data is available for processing by at least one data processor, the at least one indication to be provided, at least in part, prior to an entirety of the at least one portion of the data being available for the processing by the at least one data processor, the at least one data processor to begin the processing in response, at least in part, to the at least one indication;

the circuitry also being to provide information in at least one descriptor, the at least one descriptor to be written in at least one memory location, the information to be logically set to indicate, at least in part, whether the at least one descriptor is valid, the at least one descriptor being associated with the at least one portion of the data;

wherein, after the at least one descriptor has been processed at least in part, the at least one descriptor is to be modified by resetting the information to indicate, at least in part, that the at least one descriptor is available to be overwritten, at least in part, and after the resetting, the at least one descriptor, as modified, is to overwrite the at least one memory location; and also wherein:

determination by the circuitry that the information indicates, at least in part, that the at least one descriptor is no longer valid, is to result, at least in part, in the at least one data processor discontinuing processing of the at least one descriptor and the at least one portion of the data that is associated with the at least one descriptor; and the circuitry is to provide, at least in part, the at least one indication by writing the at least one indication into at least one circular ring data structure entry in a circular ring data structure prior to, at least in part, an initiation, at least in part, by circuitry of writing of the at least one portion of the data, the at least one descriptor, and the information.

9. The method of claim 8, wherein:

the circuitry comprises, at least in part, at least one host processor;

at least one circuit board comprises, at least in part, host memory and the at least one host processor;

the at least one data processor comprises, at least in part, network interface controller (NIC) circuitry (NICC);

at least one circuit card comprises, at least in part, the NICC;

the at least one circuit card is to be communicatively coupled, at least in part, to the at least one circuit board;

the at least one indication comprises at least one doorbell that is to be written, at least in part, to the host memory; and the at least one doorbell comprises:
  at least one pointer to the at least one portion of the data; and
  at least one indicator to indicate, at least in part, at least one size of the at least one portion of the data.

10. The method of claim 8, wherein:
the circuitry is to write, at least in part, the at least one indication to at least one memory mapped input/output (MMIO) space in host memory, the at least one MMIO space being associated, at least in part, with the at least one data processor;
the data comprises the at least one portion of the data and at least one other portion of the data;
the at least one indication comprises at least one pointer to the at least one portion of the data;
the at least one indication is to indicate that both of the at least one portion of the data and the at least one other portion of the data are available for the processing by the at least one data processor;
the at least one data processor is to begin the processing of the at least one portion of the data prior to the at least one other portion of the data being actually available for the processing by the at least one data processor; and
the circuitry is to make the at least one other portion of the data available, at least in part, for the processing by the at least one data processor contemporaneously, at least in part, with the processing of the at least one portion of the data by the at least one data processor.

11. The method of claim 8, wherein:
the circuitry is to write into at least one subset of host memory:
  the at least one portion of the data;
  the at least one descriptor; and
  the information, the information also being associated, at least in part, with contents of the at least one subset of the host memory, the information indicating, at least in part, whether the at least one portion of the data and the at least one descriptor written in the at least one subset of the host memory are valid;
the at least one data processor is to initiate reading of the at least one portion of the data, the at least one descriptor, and the information, such that the reading is to occur contemporaneously, at least in part, with writing by the circuitry into the at least one subset of the host memory of the at least one portion of the data, the at least one descriptor, and the information.

12. The method of claim 11, wherein:
the at least one subset of the host memory comprises:
  at least one pre-allocated memory ring in host kernel memory to store the at least one descriptor; and
  at least one host kernel memory buffer to store the at least one portion of the data;
the at least one descriptor is written into the at least one pre-allocated memory ring after the at least one portion of the data has been written into the at least one host kernel memory buffer;
the at least one indication comprises at least one doorbell that is to be written into at least one doorbell ring associated, at least in part, with the at least one data processor; and the at least one data processor is to examine the information to determine, at least in part, whether the at least one descriptor and the at least one portion of the data are valid.

13. The method of claim 12, wherein:
the information comprises:
  respective descriptor information to indicate, at least in part, whether the at least one descriptor is valid;
  respective data portion information to indicate, at least in part, whether the at least one portion of the data is valid;
after the at least one data processor has processed the at least one portion of the data and the at least one descriptor, the at least one data processor is to modify the respective data portion information and the respective descriptor information to indicate that the at least one portion of the data and the at least one descriptor are no longer valid and have been made available to the circuitry for reuse.

14. The method of claim 12, wherein:
the circuitry is to copy the at least one portion of the data from at least one application buffer into the at least one host kernel memory buffer;
the at least one indication is to indicate, at least in part:
  at least one location of the at least one portion of the data in the at least one host kernel memory buffer; and
  a number of portions of the data to be processed by the at least one data processor; and
the at least one data processor is to maintain a counter to be used in determining, at least in part, whether the at least one data processor has completely processed all of the number of portions of the data.

15. Non-transitory computer-readable memory storing one or more instructions that when executed by a machine result in performance of operations comprising:
providing, at least in part, by circuitry, at least one indication that at least one portion of data is available for processing by at least one data processor, the at least one indication to be provided, at least in part, prior to an entirety of the at least one portion of the data being available for the processing by the at least one data processor, the at least one data processor to begin the processing in response, at least in part, to the at least one indication;
the circuitry also being to provide information in at least one descriptor, the at least one descriptor to be written in at least one memory location, the information to be logically set to indicate, at least in part, whether the at least one descriptor is valid, the at least one descriptor being associated with the at least one portion of the data;
wherein, after the at least one descriptor has been processed at least in part, the at least one descriptor is to be modified by resetting the information to indicate, at least in part, that the at least one descriptor is available to be overwritten, at least in part, and after the resetting, the at least one descriptor, as modified, is to overwrite the at least one memory location; and
also wherein:
  determination by the circuitry that the information indicates, at least in part, that the at least one descriptor is no longer valid, is to result, at least in part, in the at least one data processor discontinuing processing of the at least one descriptor and the at least one portion of the data that is associated with the at least one descriptor; and the circuitry is to provide, at least in part, the at least one indication by writing the at least one indication into at least one circular ring data structure entry in a circular ring data structure prior to, at least in part, an initiation, at least in part, by circuitry of writing of the at least one portion of the data, the at least one descriptor, and the information.

16. The computer-readable memory of claim 15, wherein:
the circuitry comprises, at least in part, at least one host processor;
at least one circuit board comprises, at least in part, host memory and the at least one host processor;
the at least one data processor comprises, at least in part, network interface controller (NIC) circuitry (NICC);
at least one circuit card comprises, at least in part, the NICC;
the at least one circuit card is to be communicatively coupled, at least in part, to the at least one circuit board;
the at least one indication comprises at least one doorbell that is to be written, at least in part, to the host memory; and
the at least one doorbell comprises:
at least one pointer to the at least one portion of the data; and
at least one indicator to indicate, at least in part, at least one size of the at least one portion of the data.

17. The computer-readable memory of claim 15, wherein:
the circuitry is to write, at least in part, the at least one indication to at least one memory mapped input/output (MMIO) space in host memory, the at least one MMIO space being associated, at least in part, with the at least one data processor;
the data comprises the at least one portion of the data and at least one other portion of the data;
the at least one indication comprises at least one pointer to the at least one portion of the data;
the at least one indication is to indicate that both of the at least one portion of the data and the at least one other portion of the data are available for the processing by the at least one data processor;
the at least one data processor is to begin the processing of the at least one portion of the data prior to the at least one other portion of the data being actually available for the processing by the at least one data processor; and
the circuitry is to make the at least one other portion of the data available, at least in part, for the processing by the at least one data processor contemporaneously, at least in part, with the processing of the at least one portion of the data by the at least one data processor.

18. The computer-readable memory of claim 15, wherein:
the circuitry is to write into at least one subset of host memory:
the at least one portion of the data;
the at least one descriptor; and
the information, the information also being associated, at least in part, with contents of the at least one subset of the host memory, the information indicating, at least in part, whether the at least one portion of the data and the at least one descriptor written in the at least one subset of the host memory are valid;
the at least one data processor is to initiate reading of the at least one portion of the data, the at least one descriptor, and the information, such that the reading is to occur contemporaneously, at least in part, with writing by the circuitry into the at least one subset of the host memory of the at least one portion of the data, the at least one descriptor, and the information.

19. The computer-readable memory of claim 18, wherein:
the at least one subset of the host memory comprises:
at least one pre-allocated memory ring in host kernel memory to store the at least one descriptor; and
at least one host kernel memory buffer to store the at least one portion of the data;
the at least one descriptor is written into the at least one pre-allocated memory ring after the at least one portion of the data has been written into the at least one host kernel memory buffer;
the at least one indication comprises at least one doorbell that is to be written into at least one doorbell ring associated, at least in part, with the at least one data processor; and
the at least one data processor is to examine the information to determine, at least in part, whether the at least one descriptor and the at least one portion of the data are valid.

20. The computer-readable memory of claim 19, wherein:
the information comprises:
respective descriptor information to indicate, at least in part, whether the at least one descriptor is valid;
respective data portion information to indicate, at least in part, whether the at least one portion of the data is valid;
after the at least one data processor has processed the at least one portion of the data and the at least one descriptor, the at least one data processor is to modify the respective data portion information and the respective descriptor information to indicate that the at least one portion of the data and the at least one descriptor are no longer valid and have been made available to the circuitry for reuse.

21. The computer-readable memory of claim 19, wherein:
the circuitry is to copy the at least one portion of the data from at least one application buffer into the at least one host kernel memory buffer;
the at least one indication is to indicate, at least in part:
at least one location of the at least one portion of the data in the at least one host kernel memory buffer; and
a number of portions of the data to be processed by the at least one data processor; and
the at least one data processor is to maintain a counter to be used in determining, at least in part, whether the at least one data processor has completely processed all of the number of portions of the data.

22. The apparatus of claim 1, wherein:
the at least one indication comprises at least one doorbell that is to be written, at least in part, to the host memory; and
the at least one doorbell comprises:
at least one pointer to the at least one portion of the data;
the at least one descriptor; and
at least one indicator to indicate, at least in part, at least one size of the at least one portion of the data.

23. An apparatus usable, at least in part, in association with at least one host, the apparatus comprising:
means for providing, at least in part, at least one indication that at least one portion of data is available for processing by at least one data processor, the at least one indication to be provided, at least in part, prior to an entirety of the at least one portion of the data being available for the processing by the at least one data processor, the at least one data processor to begin the processing in response, at least in part, to the at least one indication, the means for providing comprising circuitry;

the means for providing also being to provide information in at least one descriptor, the at least one descriptor to be written in at least one memory location, the information to be logically set to indicate, at least in part, whether the at least one descriptor is valid, the at least one descriptor being associated with the at least one portion of the data;

wherein, after the at least one descriptor has been processed at least in part, the at least one descriptor is to be modified by resetting the information to indicate, at least in part, that the at least one descriptor is available to be overwritten, at least in part, and after the resetting, the at least one descriptor, as modified, is to overwrite the at least one memory location; and also wherein:
- determination by the circuitry that the information indicates, at least in part, that the at least one descriptor is no longer valid, is to result, at least in part, in the at least one data processor discontinuing processing of the at least one descriptor and the at least one portion of the data that is associated with the at least one descriptor; and
- the circuitry is to provide, at least in part, the at least one indication by writing the at least one indication into at least one circular ring data structure entry in a circular ring data structure prior to, at least in part, an initiation, at least in part, by circuitry of writing of the at least one portion of the data, the at least one descriptor, and the information.

24. The apparatus of claim 23, wherein:

the means for providing is also to write into at least one subset of host memory:
- the at least one portion of the data;
- the at least one descriptor; and
- the information, the information also being associated, at least in part, with contents of the at least one subset of the host memory, the information indicating, at least in part, whether the at least one portion of the data and the at least one descriptor written in the at least one subset of the host memory are valid;

the at least one data processor is to initiate reading of the at least one portion of the data, the at least one descriptor, and the information, such that the reading is to occur contemporaneously, at least in part, with writing by the means for providing into the at least one subset of the host memory of the at least one portion of the data, the at least one descriptor, and the information.

25. The apparatus of claim 24, wherein:

the at least one subset of the host memory comprises:
- at least one pre-allocated memory ring in host kernel memory to store the at least one descriptor; and
- at least one host kernel memory buffer to store the at least one portion of the data;

the at least one descriptor is written into the at least one pre-allocated memory ring after the at least one portion of the data has been written into the at least one host kernel memory buffer;

the at least one indication comprises at least one doorbell that is to be written into at least one doorbell ring associated, at least in part, with the at least one data processor; and the at least one data processor is to examine the information to determine, at least in part, whether the at least one descriptor and the at least one portion of the data are valid.

* * * * *